March 26, 1968    E. H. SCHWARTZMAN    3,374,674
FLUID FLOWMETER

Filed Feb. 23, 1965    6 Sheets-Sheet 1

INVENTOR.
EVERETT H. SCHWARTZMAN
BY
Nilsson, Robbins & Anderson
ATTORNEYS

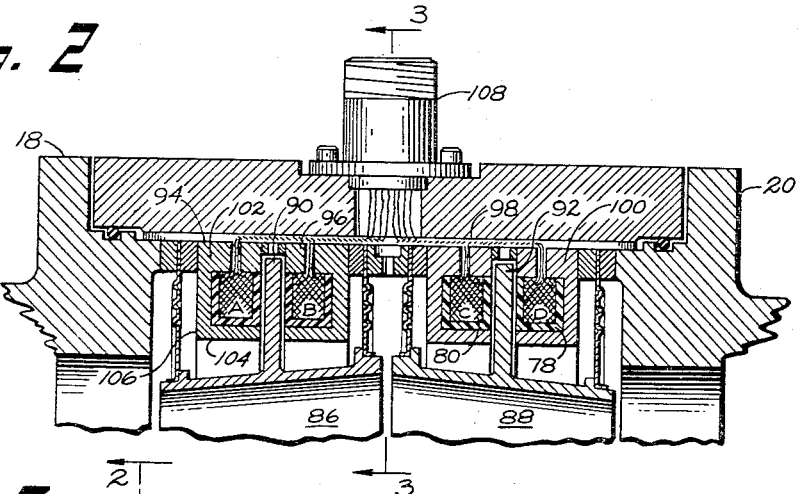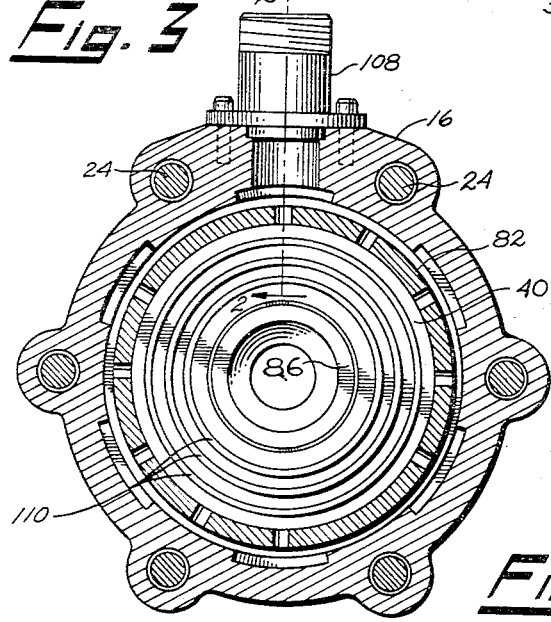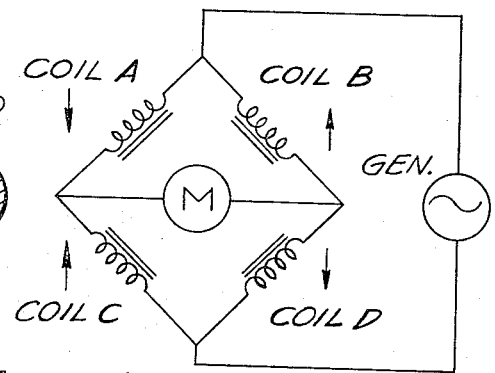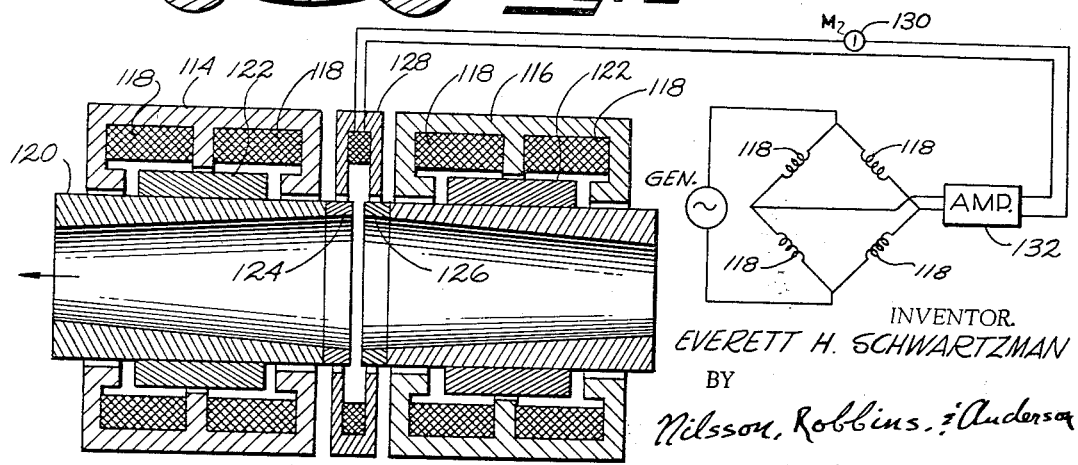
INVENTOR.
EVERETT H. SCHWARTZMAN
BY
Nilsson, Robbins, & Anderson
ATTORNEYS March 26, 1968  E. H. SCHWARTZMAN  3,374,674
FLUID FLOWMETER
Filed Feb. 23, 1965  6 Sheets-Sheet 3
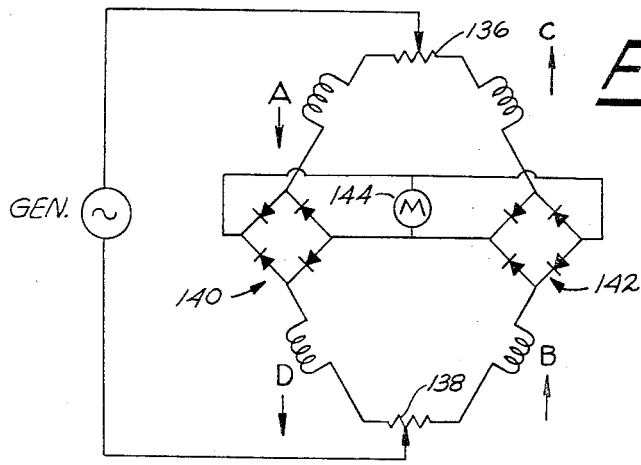
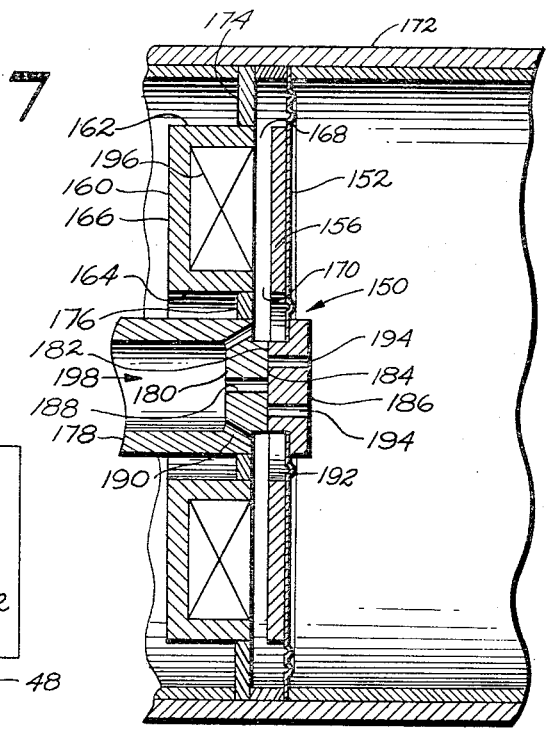
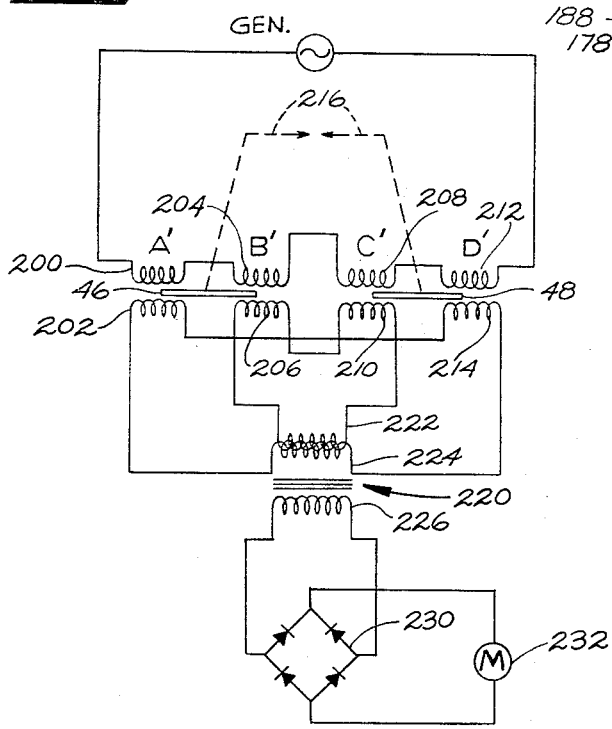
INVENTOR.
EVERETT H. SCHWARTZMAN
BY
Nilsson, Robbins, & Anderson
ATTORNEYS March 26, 1968 E. H. SCHWARTZMAN 3,374,674
FLUID FLOWMETER
Filed Feb. 23, 1965 6 Sheets-Sheet 4

INVENTOR.
EVERETT H. SCHWARTZMAN
BY
Nilsson, Robbins & Anderson
ATTORNEYS

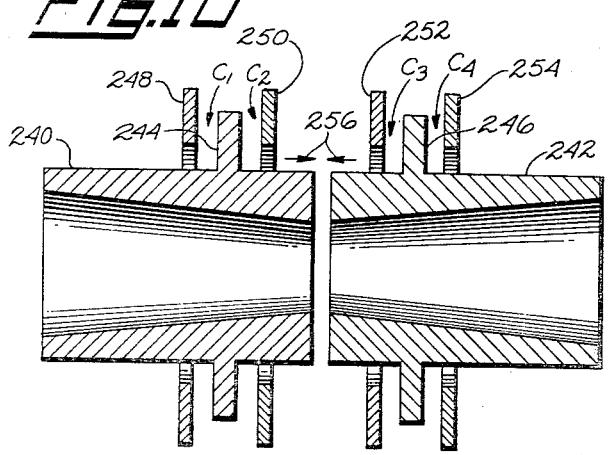
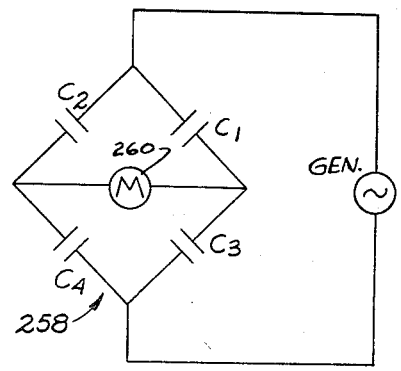
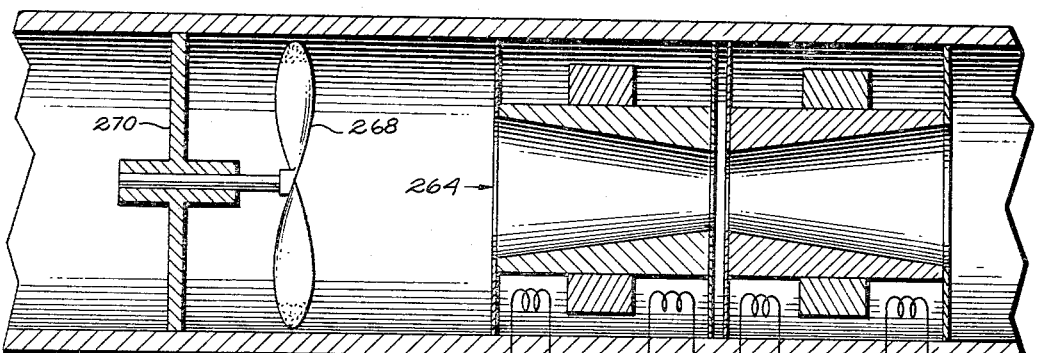
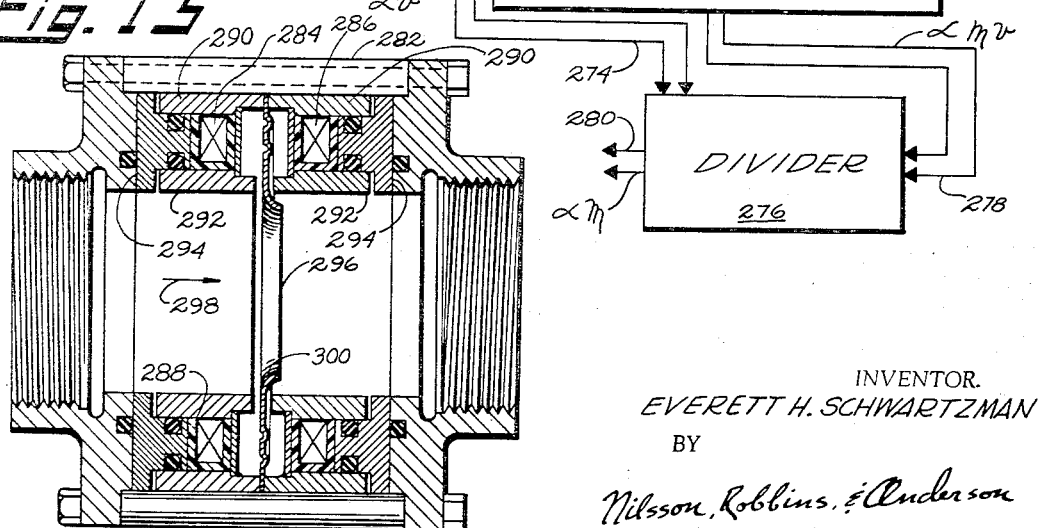

March 26, 1968 — E. H. SCHWARTZMAN — 3,374,674

FLUID FLOWMETER

Filed Feb. 23, 1965 — 6 Sheets-Sheet 6

INVENTOR.
EVERETT H. SCHWARTZMAN
BY
Nilsson, Robbins, & Anderson
ATTORNEYS

United States Patent Office 3,374,674
Patented Mar. 26, 1968

3,374,674
FLUID FLOWMETER
Everett H. Schwartzman, 457 34th St.,
Manhattan Beach, Calif. 90266
Filed Feb. 23, 1965, Ser. No. 434,179
14 Claims. (Cl. 73—213)

ABSTRACT OF THE DISCLOSURE

A flowmeter including two generally-similar, venturi members defining tapered internal passages, which members are held independently spaced apart by diaphragm structures so as to receive the fluid stream that is to be measured. The spaced displacement of the venturi members allows them to respond to variations in fluid flow with opposed movements which are sensed by electrical apparatus to manifest the measured flow as an electrical signal. The requisite opposed movements of the venturi members to measure flow renders the structure immune from various other factors, as acceleration forces and so on. The disclosure includes inductive, capacitive and resistance elements for providing an electrical signal indicative of flow.

---

This invention relates generally to measurement of the flow of fluids, gaseous or liquid, along a given path or direction; and more particularly the invention relates to a system and method which utilize novel concepts in electromagnetic electromechanical transducers and sensors.

In contemporary industry and modern research and development endeavors there has arisen a heretofore unfulfilled need for a flowmeter for accurately measuring the flow of fluid substances such as liquid oxygen at high pressures and at extremes of velocity and temperature.

Transducers heretofore available have provided measurements which are subject to errors due to non-constant characteristics of the fluid such as its viscosity, density, thermo-conductivity or the like. In addition, the instruments are typically mechanically unstable, fragile, or bulky or are costly and require complex electrical circuitry to compensate for their inherent nonlinearity. Furthermore, the prior art transducers are generally incapable of insertion into a chemically active (e.g., acid) flow. In addition, they are typically gravity sensitive, requiring that they be placed and maintained in a particular orientation with respect to the direction of the field of gravity and are acceleration sensitive causing their electrical output to be spurious whenever the transducer is subjected to mechanical shock or other acceleration of the unit or its component parts.

Other disadvantages and limitations of prior art devices include their slow response time which precludes or limits their use in recording transients and in many other applications. Similarly, their utilization of a particular transducer is limited to a relatively narrow range of flow velocities. Some prior art systems depend upon a rotating propeller or other similar device mounted on a shaft in the path of the fluid flow. The rotational velocity of the propeller, driven by kinematics of the fluid flow, is then coupled out of the fluid conduit or other environment of the flow and converted into a signal representative of the velocity of the fluid. Such transducers suffer many of the disadvantages pointed out above and in addition introduce severe lubrication problems for the bearing of the rotating device, particularly in a cryogenic, radioactive, or chemically active environment. Furthermore, any mechanical connection between the rotary device and external components also presents serious problems of bearing lubrication and leakage. Any leakage is of course absolutely intolerable in many modern fluid flow applications.

It is, therefore, an object of the present invention to provide a flowmeter system and method which are not subject to these and other disadvantages of the prior art.

It is another object to provide such apparatus including a transducer or electrical sensing component which may provide, when desired, an electrical effect which is directly proportional to the velocity of the fluid flow.

It is another object to provide such a system which is extremely accurate and sensitive and which is not subject to errors due to changes in density, viscosity, temperature or other characteristics of the fluid.

It is another object to provide such apparatus which is mechanically rugged, stable and compact, relatively inexpensive, and which does not require bearing surfaces within the fluid or mechanical couplings, bearings, or packing boxes through the fluid containing walls and which is fully operable in environments of temperature and pressure extremes and radioactivity.

It is another object to provide such apparatus which has a response time of an order of a fraction of a millisecond and which is neither orientation nor acceleration sensitive.

It is another object to provide such a system which does not cause an appreciable pressure drop in the fluid flow being observed.

Briefly, these and other objects of the invention are achieved in one example of the invention which includes a pair of closely spaced, axially aligned, hollow cylindrical armature members which are internally tapered whereby their contiguous ends have a smaller diameter, in this example, than their opposite ends. The armature members may be metal and are supported at each of their ends by annular, flexible metal diaphragms. The in-register bores of the diaphragms and armature members define the path of the fluid flow through the sensor; and the combined tapered bores form a venturi having a reduced diameter region near the axial mid-point of the combined armature members. The reduced diameter portion is coupled to the annular volume between the two juxtaposed center diaphragms while fluid pressures in the enlarged diameter end portions of the venturi are coupled to the outer surface of each of the outer supporting diaphragms. Thusly, when the fluids are passed through the combined tapered bores of the sensor, the pressure and consequent outward axial forces on the central diaphragms are less than that exerted axially inwardly on the outer diaphragms by a net force which depends on the velocity of the fluid. Consequently, the armature members are displaced axially toward each other against the retaining, restoring forces of their supporting diaphragms, by a displacement, the magnitude of which is the measure of the velocity of the fluid flow.

Each of the armature members may carry a paramagnetic ring or ferrule which constitutes an element of a magnetic circuit separated from other lower reluctance elements thereof by an air gap, the instantaneous reluctance or gap dimension of which is determined by the axial position of the ferrule which is in turn carried by its respective armature member.

Electrical or, in some embodiments, electric servomechanical circuitry is provided in cooperation with the structure of the above example to provide the particular desired form of the electrical analog associated with the sensor. For example, each of the paramagnetic ferrules mentioned may constitute an element in the magnetic circuit of a pair of sensing coils associated with each armature in a manner such that movement of the armature causes opposite effects in the two sensing coils associated with that armature. Then, due to the symmetry of the two armatures and venturis, the four sensing coils may be connected in a detecting bridge whereby displacement or motions of the armatures due to other than venturi effects are electrically cancelled out. Such non-venturi displacements may be due for example, to viscous drag effects of the fluid flow, acceleration of the meter environment, differential thermal strains and the like. A corollary advantage of this type of mechanical-electrical network is that the sensitivity of the sensing mechanism is vastly increased, over what it would otherwise be, due to the push-pull technique utilized in the network. Details of such components of the combination as well as additional examples of the sensor-transducer mechanizations and other novel features and their principles of operation as well as additional objects and advantages of the invention will become apparent and be best understood from a consideration of the following description taken in connection with the accompanying drawings which are all presented by way of example only and in which:

FIG. 2 is a portion of a similar longitudinal sectional view of an alternative example of such flowmeter structure (see lines 2—2 of FIG. 3 infra);

FIG. 3 is a cross-sectional view of the apparatus of FIG. 2 taken along the lines 3—3 thereof;

FIG. 4 is a schematic diagram illustrating a generalized example of electrical circuitry utilized in cooperation with the structure of the earlier figures;

FIG. 5 is a simplified diagram partially in longitudinal section and partially schematic of an alternative embodiment of a flowmeter system constructed in accordance with the principles of the present invention;

FIG. 6 is a schematic diagram of a more specific example of circuitry which is in some respects alternative to that illustrated in FIG. 4;

FIG. 7 is a longitudinal sectional view of a portion of an alternative embodiment of the invention;

FIG. 8 is a schematic diagram of an example of the electrical circuitry utilized in combination with other flowmeter structure of the present invention;

FIG. 10 is a simplified longitudinal sectional view of an alternative embodiment of the flowmeter sensor structure of the present invention;

FIG. 11 is a schematic view of an example of electrical circuitry utilized in combination with the apparatus illustrated in FIG. 10;

FIG. 12 is a partially sectional, partially schematic diagram illustrating an alternative embodiment of a flowmeter system constructed in accordance with the principles of the present invention; and FIG. 13, FIG. 14, FIG. 15, FIG. 16 and FIG. 17 are longitudinal sectional views of yet other examples of flowmeter apparatus constructed in accordance with the teachings and discoveries of the present invention.

With specific reference now to the figures in more detail, it is stressed that the particulars shown are by way of example and for purposes of illustrative discussion only and are presented in the cause of providing what is believed to be the most useful and readily understood description of the principles and structural concepts of the invention. In this regard, no attempt is made to show structural details of the apparatus in more detail than is necessary for a fundamental understanding of the invention, the description taken with the drawings making apparent to those skilled in the art and technology of flowmeters how the several forms of the invention may be embodied in practice. Specifically, the detailed showing is not to be taken as a limitation upon the scope of the invention which is defined by the appended claims forming, along with the drawings, a part of this specification.

Figure 1:
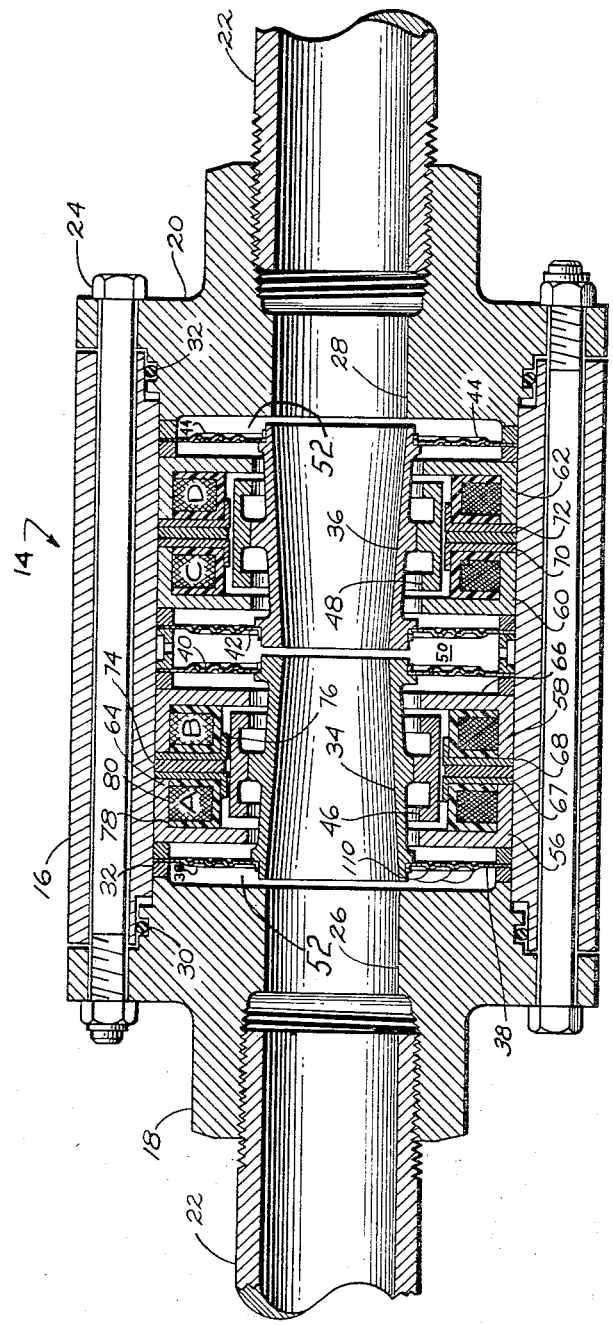
FIG. 1 is a longitudinal sectional view of an example of an electro-magnetic flowmeter apparatus constructed in accordance with the principles of the present invention.

Referring to FIG. 1, an example of a flowmeter 14 is illustrated which includes a central outer hollow cylindrical body portion 16 and a pair of enclosing end members 18, 20. The end members are shown joined to external system piping 22 as by conventional threaded joining. The end members 18, 20 are axially compressively joined to the central body portion 16 by a series of tension supporting, peripherally distributed, axially oriented assembly bolts 24. The resulting confined volume within the body portion 16 and the end members 18, 20 forms what may be termed a series conduit body which communicates with the external system piping 22 through axial ports 26, 28 provided respectively through the end members 18, 20 in register with the threaded connections for the external piping. Sealing O-rings 30, 32 housed within appropriate retaining channels may be provided for hermetically sealing the assembly together while at the same time providing ready disassembly for access to sensing elements housed within the assembly.

The flowmeter sensing elements comprise a pair of venturi members 34, 36 which are supported concentrically within the central body portion 16 coaxially therewith and, with a degree of resilient axial motion, by annular diaphragms 38, 40, 42, 44. The former two are disposed one each at either end of the venturi member 34 while the latter two are disposed supportingly at either end of the venturi member 36. The venturi members are formed of a generally low inertia structure which in this example is tubular aluminum with a larger inner diameter at each of their outer extremities, that is, contiguously to the end members 18, 20; and with a smaller inner diameter near an axial central plane of symmetry from which the venturi members are each slightly axially spaced and about which they are disposed in mirror image symmetry. Each of the venturi members carries a paramagnetic toroidal piston 46, 48 secured about the periphery of the central portion of each of the respective venturi members concentrically with the axis of the system.

In operation, very briefly, fluid flow through the conduit system along the axis of the structure shown in FIG. 1, causes, by Bernouli effect, a decreased pressure in the annular space 50, between the symmetric halves of the unit, with respect to that existant in the annular chambers 52, 54 at the ends of the unit between the respective venturi members and the end members 18, 20. This decreased pressure, the magnitude of which is a measure of the rate of flow along the axis of the system permits, or causes, an axial displacement of each of the venturi members toward the plane of symmetry at the center of the device. This axial motion causes a corresponding displacement of the paramagnetic pistons 46, 48 which in turn affects a magnetic-electric network in a manner to be described in more detail below.

The remainder of the magnetic circuit housed within the body of the flowmeter 14 includes, in this example, four paramagnetic cup members 56, 58, 60, 62. Each of the cup members includes an outer rim portion 64 and an annulus portion 66 which is centrally ported to provide clearance for the venturi members and which is joined at its outer periphery to one end of the rim portion 64. The cup members are arranged in pairs symmetrically about each of the paramagnetic pistons, 46, 48 with concave configurations being juxtaposed toward each other. Disposed symmetrically within each of the juxtaposed pair of cup members is a symmetrically arranged second pair of paramagnetic members 67, 68, 70, 72 which each comprise an annulus portion 74 joined with an inner rim portion 76. The pair of the paramagnetic members 67, 68, 70, 72 are arranged with their annulus portions juxtaposed and in contact at their outer peripheries with a respective one of the paramagnetic cup members 56, 58, 60, 62 and with their inner rim portions 76 projecting axially toward a respective one of the annulus portions 66 of the cup members. The end of the inner rim portion 76 does not contact the annulus portion 66 of the cup members but is axially spaced therefrom to form a high reluctance gap in the otherwise permeable loop around the toroidal cross-section formed by the cup members and the paramagnetic members 67, 68, 70, 72. The inner cylindrical surface of the rim portions 76 is each radially juxtaposed with respect to the outer cylindrical surface of a portion of a respective one of the paramagnetic pistons 46, 48. As may then be seen from the figure, axial motion of the venturi members increases or decreases the axial length of the effective high-reluctance gap in the magnetic loops formed by the cup members, the paramagnetic members 67, 68, 70, 72, and the paramagnetic pistons 46, 48.

A toroidal spool 78 wound with a sensing coil 80 is interposed within each of the magnetic toroids just described. These coils are additionally labeled A, B, C and D for ready correlation with certain of the subsequent circuit diagrams.

In the assembly of the end members 18, 20, the central body portion 16, and the paramagnetic sensing elements and diaphragm members within the body portion, a series of spacing rings are disposed in a stacking manner with the other elements in a manner to determine and secure the desired axial relationships therebetween. It may be noted that the spacing rings are all relatively radially thin except for those compressively juxtaposed between the annulus portions 74 of the paramagnetic members 67, 68, 70, 72. These latter spacing rings may have a radial dimension substantially equal to that of the annulus portion of portions 64.

Referring to FIG. 2, an alternative example of the invention is illustrated which includes a pair of magnetic venturi members 86, 88 which, in addition to being fabricated integrally with the paramagnetic armature portion 90, 92, are formed, or disposed with their larger diameter portions placed axially adjacent to each other with the smaller diameter portions being disposed near the end members 18, 20. The remainder of the magnetic circuits for the sensing elements comprise paramagnetic collar members 94, 96, 98, 100 which are toroidal with a torus cross section having a cup shape which is open in one axial direction. The paramagnetic collar members are disposed in pairs with their concave or open torus portions being juxtaposed toward each other with a respective one of the paramagnetic armature portions 90, 92 interposed therebetween. The toroidal magnetic loop circuit is then seen to be formed by the cup shaped torus section of the collar members in cooperation with the radially extending paramagnetic armature portion 90, 92. Each of the collar members 94, 96, 98, 100 may also be described in this example as being formed by a pair of radially spaced rim members 102, 104 interconnected by an annular plate 106. Within the torus cup formed between the rim members 102, 104 is disposed the sensing coils 80 (A, B, C, D) wound in the spools 78. Shown also in the view of FIG. 2 are the electrical leads to the sensing coils which extend from the individual sensing coils as shown to a hermetic connector plug 108.

Referring to FIG. 3, the central sectional view therein presented shows the hermetic connector plug 108 in elevation as mounted to the central portion of the body member 16. The peripheral distribution of the assembly bolts 24 is shown more clearly in this view as is the central one of the spacing rings 82 and one of the annular diaphragms 40. Concentric annular corrugations 110 in the diaphragm member may also be seen in the view of FIG. 3. The large diameter end of the venturi member 86 is also illustrated in this view.

In FIG. 4 a schematic diagram of an example of a flowmeter sensing circuit is illustrated in which the four sensing coils 80 (coil A, coil B, coil C and coil D) are connected in a bridge circuit with the coils connected in a loop ABCDA, clockwise as shown in the figure, with an alternating current generator connected between the opposite points at the junction between coils A and B and the junction between the coils C and D, and with a meter M connected between the other opposite loop points; that is, between coils A and B and between coils B and C.

In operation it may be seen that initially the bridge may be balanced if the inductive reactance of each of the coils is equal. In this event, there would be no current through the meter M. It may also be seen that when the venturis are moved in the same direction as by vibration or acceleration effects, the changes in inductive reactance cancel and the bridge remains balanced. When, however, the fluid is forced through the venturi members, they are displaced axially away from each other causing the inductive reactance of coils B and C to be lowered while that of coils A and D is increased. Thusly, the bridge network is unbalanced in a push-pull fashion so that current from the alternating current generator flows predominantly through coils B and C, effectively in series with the meter M, while less current flows through the coils A and D. The magnitude of unbalance of the bridge network and consequently the level of current through the meter M is clearly a measure of the magnitude of fluid flow through the flowmeter 14.

It may be noted that, typically, the specific object when measuring fluid flow is to obtain the mass rate of flow (M), i.e., mass per unit of time of the gas or liquid past a given point. For incompressible fluids, the density (mass per unit of volume) may be assumed to be constant, ignoring second order temperature and pressure effects.

In the examples of the invention thus far described, the electrical output of the flowmeter is generally proportional to the mass rate of flow times the fluid velocity (M$v$). Thus, the mass rate of flow may be obtained by dividing, electrically this quantity by the velocity $v$. This may be accomplished by the structure illustrated in FIG. 12 below. However, the mass rate of flow may also be obtained by taking the square root of the quantity M$v$, since from the continuity equation ($M=\rho g v A$, where $\rho g$ is the fluid density, and A is the cross sectional area of the fluid conduit at the point of observation)

$$v = \frac{M}{\rho g A}$$

and by substitution $$M v \text{ (the meter output)} = \frac{M^2}{\rho g A} = K M^2$$

where $k$ is a constant for an incompressible fluid. A standard, shelf unit is then used to operate electrically on the flowmeter output to obtain the quantity M.

For compressible fluids, wherein the density varies as a function of temperature and pressure which must be accounted for, consider again that the electrical output of the flowmeter is $$\frac{M^2}{\rho g k} = \frac{M^2}{\rho g N R T}$$

where NR is the appropriate gas constant and T is the gas temperature. In this equation, $\rho g$ may be determined from the gas equation $$\rho g = \frac{P}{N R T}$$

where P is the gas pressure. An electrical analog of P may be obtained from a pressure sensor and of T from a temperature transducer. Thus by dividing the meter output by $\rho g$NRT, the quantity M$^2$ is obtained, the square root of which is the desired quantity.

Referring to FIG. 5 an example of the invention is illustrated schematically in which the degree of unbalance in the bridge network is utilized to drive a servo in order, automatically, to null the current through the meter M. This is accomplished in an embodiment where fluid flow causes the venturi members to separate, as in the example of FIG. 2 and an electrical solenoid is used to drive the venturi members back to their "balanced" disposition. The solenoid type force required so to drive the venturi members is substantially proportional to the square of the magnitude of the solenoid current. Thusly, since the resultant axial forces due to the Bernouli effect are substantially proportional to the square of the velocity of fluid flow, the driving current for the solenoid servo is directly proportional to the velocity of the fluid flow through the venturis, for non-compressible fluids.

When this example of the invention is utilized to obtain M for a compressible fluid, the output of the flowmeter, $$\frac{M}{k\rho g}$$

may be operated upon as follows:

$$\rho g = \frac{P}{NRT}$$

may be obtained, as discussed above, from pressure and temperature pick ups and performing electrically the indicated arithmetic. Then by extracting the square root of $\rho g$ thus obtained, the result may be divided into the flowmeter output to obtain M.

It may also be noted that the present invention may be utilized to obtain the quantity $g$ for gases. From the continuity equation, it is clear when M and $v$ are known ($v$ being obtained as by the embodiment of FIG. 12 below), $\rho g$ is readily obtained straight forward electrical arithmetic operation.

Similarly, a gas constant meter is readily provided in accordance with another arrangement of the present invention: from $$\rho g = \frac{P}{NRT}$$

or $$NR = \frac{P}{\rho g T}$$

it is apparent that by appropriate operation upon the output of the density ($\rho g$) meter above, a pressure sensor, and a temperature sensor, the quantity NR may be provided dynamically and directly.

The apparatus of FIG. 5 includes a pair of cylindrical E coils 114, 116 which are each wound with a sensing coil 118. The axialy resiliently displaceable venturi members 120 each carry a paramagnetic ferrule 122 which forms a portion of the variable reluctance magnetic circuit for each of the halves of the cylindrical E coils. In addition to each of the paramagnetic ferrules 122, each of the venturis 120 carries a paramagnetic end portion 124, 126 which together cooperatively form a portion of the solenoid effect magnetic servo coil 128. As indicated earlier, the coils 118 are connected in a bridge network which is excited by an alternating current generator, and the output of which is fed to an amplifier 132 which in turn drives the magnetic servo coil 128 to maintain the balanced state or disposition of the venturi armatures within the flowmeter apparatus. The current required to maintain this balance is indicated or recorded by the instrument 130.

Referring to FIG. 6, an alternative example of a detecting circuit which here incorporates a demodulator for the sensor or transducer system is illustrated. In this example the current feed from the alternating current generator is impressed upon the movable center tap of each of a pair of potentiometers 136, 138, the fixed resistance of which is interconnected respectively between coils A and C and between coils B and D. The opposite terminals of coils A and D are interconnected by a diode rectifier bridge 140 while the corresponding terminals of coils B and C are interconnected by a similar detecting bridge 142. The output terminal pair of the detector bridges 140 and 142 are connected together in parallel with an indicator or recording instrument 144 connected therebetween. The bridge output as seen at the instrument 144 is of course a direct current voltage; and the overall bridge, including the major legs comprising the coils A, B, C and D, operates basically in the same manner as does the similar bridge of FIG. 4.

In the example of the network of FIG. 6 however, either one of the potentiometers 136, 138 may be utilized to balance or null the bridge under static conditions. Both potentiometers may then be shifted to the left or right in parallel to control the sensitivity of each armature and its corresponding magnetic circuit thus making their sensitivity the same even though during their manufacture there may have been slight differences in the weights of the armatures or different spring constants for the supporting diaphragms due to manufacturing imperfections and differences in materials. In this manner then, the natural frequency of each diaphragm-armature system can be completely electrically compensated and balanced with the other thereby insuring a balance of the instrument from both a mechanical (sensitivity) and an electrical viewpoint.

Referring to FIG. 7, an example of the invention is illustrated which utilizes a single axially resiliently displaceable armature member 150 which is supported as in the previous examples by an annular, axially flexible diaphragm 152. The diaphragm 152 may be fabricated of paramagnetic metal or is made effectively paramagnetic, as shown, by the bonding thereto of an annular paramagnetic ring member 156. The ring member may be mounted concentrically on the left hand face, as viewed in the drawing, of the diaphragm 152 and is axially spaced from and juxtaposed with respect to a toroidal cup member 160. The toroidal cup is formed by an outer rim member 162, an inner rim member 164, and an annular disk member 166 interjoining their left hand peripheries as shown. The cup member 160 thusly formed and the annular disk or ring member 156 form in cooperation, a magnetic circuit about the periphery of the rectangular toroid generator form; the magnetic circuit including a pair of gaps 168, 170.

The toroidal cup member 160 is in this example supported rigidly with respect to the outer body member 172 by a rigid nonmagnetic annular disk member 174. A second, inner disk member 176 is supportingly disposed between the inner paramagnetic rim member 164 and a stationary input conduit member 178. The right hand end of the conduit member 178 is partially occluded by an end member 180 having a right hand end face 182 which, in the absence of fluid flow through the system, is disposed in juxtaposed contact with the left hand face 184 of the armature member 150. In this example the end member 180 of the stationary inlet conduit member 178 is centrally ported by an axial duct 188 and a plurality of bleeder capillaries 190. The axial duct 188 communicates with the interface boundary between the faces 182, 184 while the bleeder capillaries 190 communicate with the toroidal space 192 between the juxtaposed diaphragm 152 and the annular disk members 174, 176. The armature member 150 is ported to form a plurality of axial ducts 194 which also communicate with the interface boundary between the faces 182, 184.

Under conditions of zero flow, the ends of the axial ducts 188, 194 at the interface boundary are substantially sealed from each other by virtue of the diaphragm 152, which retains the armature member 150 in contact with the end face 182. This axial disposition of the armature member 150 causes a predetermined minimum axial gap dimension to exist for the gaps 168, 170 for the magnetic circuit of a solenoid sensing coil 196 wound and disposed in a spool fashion within the toroidal cup of the member 160. When, however, a minute flow in the direction of the arrow 198 tends to flow in the direction indicated, a pressure is impressed upon the left hand face of the supporting diaphragm 152, through the capillaries 190 and upon the central portion of the left hand face 184 of the armature member 150 resulting in an axial force to the right of the armature member and its supporting diaphragm 152. Such an axial displacement results in a definite change in the reluctance of the magnetic circuit formed by the paramagnetic toroidal cup member 160 and the ring member 156 carried by the supporting diaphragm 152. The resulting sensor assembly or transducer system is thus extremely sensitive to near zero flow rates and provides a precision measuring function in flow metering not heretofore available.

Referring to FIG. 8, an example of the invention is illustrated which may be mechanically substantially identical to that of FIG. 1 but which is electrically a variation thereof in that the sensing coils A', B', C', D' are bifilar or double wound so that each includes an insulated pair of mutually inductively coupled coils. For example, the sensing coil A' comprises a pair of windings 200, 202; the coil B' comprises a pair of windings 204, 206; the sensing coil C' includes windings 208, 210; and sensing coil D' includes a pair of windings 212, 214. The paramagnetic pistons 46, 48 (see FIG. 1) are seen from the schematic view of FIG. 8 to affect, by their axial position, the magnitude of mutual inductance and thereby the coupling, between the associated pairs of windings of the sensing coils. The direction of the motion arrows 216 for example, indicates, again with reference to FIG. 1, that an increase in the velocity of fluid flow through the flowmeter causes a decrease in the coupling between the bifilar windings of the sensing coils A' and D' with a corresponding increase in the coupling between the windings of the sensing coils B' and C'.

In this example of the invention, the coil windings 200, 204, 208, 212 are all connected in series with a source of alternating current excitation signal and comprise the composite primary winding of what may be termed a sensor transformer. The secondary windings 202, 206, 210, 214 of the transformer are coupled to a nulling transformer 220 which has a pair of primary windings 222, 224 connected as follows: the windings 206, 210 are connected in series with each other and with the primary winding 222 of the nulling transformer 220; and the windings 202, 214 are similarly connected in series with each other and with the primary winding 224. These connections are polarized in a manner such that under static conditions of zero flow through the flowmeter, the signals from the generator coupled to the secondary windings of the sensing transformer, which are in turn coupled to the primary windings 222, 224 of the nulling transformer, are exactly opposed and cancel without coupling any signal to the secondary winding 226 of the nulling trasformer. When, however, motion, in accordance with the arrows 216, occurs of the paramagnetic pistons 46, 48, the coupling to the secondary windings 206, 210 and thence to the primary winding 222 is significantly increased while the coupling to the windings 202, 214 and thence to the primary winding 224 is significantly decreased. The net resultant signal in the primary of the nulling transformer 220 is then coupled to the secondary winding 226 which may be full wave rectified by a bridge network 230 the output of which is observed or recorded at the meter instrument 232.

Thusly, in a push-pull mode of operation, the magnitude of the flow rate through the meter system is manifest directly and substantially instantly on the meter instrument 232. It should be noted that although the electrical network of FIG. 8 has been referenced specifically to the structure shown previously in FIG. 1, the network as shown and its principles of operation apply with equal validity to various others of the structural embodiments of the invention.

Figure 9:
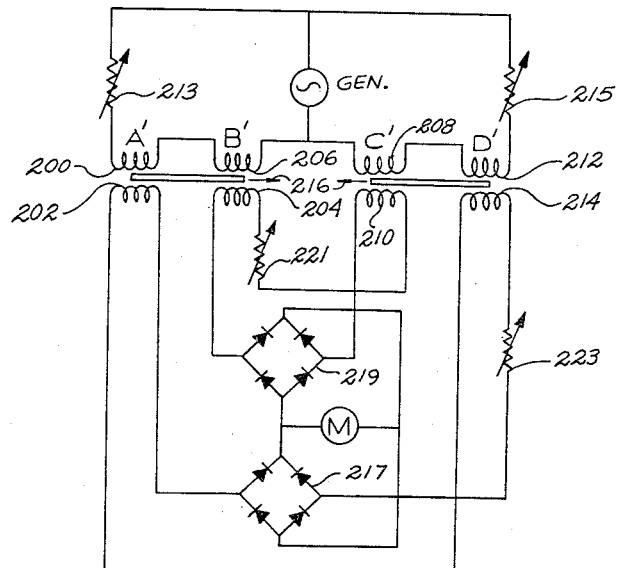
FIG. 9 is a schematic diagram of circuitry similar to that of FIG. 8.

In FIG. 9, an alternative electrical circuit for the basic structure of FIG. 8 is illustrated. In this example, the excitation coil windings 200, 206 are connected in series as are the windings 208, 212. The two resultant series are then connected in parallel across the excitation generator. Interposed in each of the series is a potentiometer 213, 215 respectively. The potentiometers provide a control on the sensitivity of each of the armatures.

The sensing windings 202, 214 are connected in series with each other and with a detecting bridge circuit 217. The other two sensing windings 204, 210 are similarly connected in series with a detecting bridge circuit 219. Each of the sensing series may also include a potentiometer 221, 223 respectively for balancing, or nulling, the output signal which is provided, as indicated, between the symmetrically interconnected demodulator bridge circuits 217, 219. A recording or indicating instrument M may be connected, as shown, between the two bridges. The operation of the excitation-sensing variable coupling apparatus including the venturi armatures and the bifilar coil windings, is substantially similar to that of FIG. 8.

In FIG. 10, in highly simplified form, an example of the invention is illustrated which is similar in most respects to the previous examples except that the sensing mechanism is based upon the variation of a capacitance parameter rather than one of inductance. To this end, a pair of venturi armature members 240, 242 are shown which each, in symmetrical fashion, carry an annular capacitor plate member 244, 246 respectively. The venturi armature members may be supported as in the previous examples by appropriate axially flexible metallic diaphragms, not shown. Axially juxtaposed with respect to each of the faces of the capacitor plates 244, 246, are mounted stationary annular disk capacitor plates 248, 250, 252, 254. It may thus be seen that the juxtaposed faces and the gap between them of the plates 248, 244 constitute a capacitor denoted $C_1$. Similarly, capacitor $C_2$ is formed by juxtaposed faces of the plates 244, 250, a capacitor $C_3$ by the juxtaposed faces of the plates 252, 246, and a capacitor $C_4$ by the juxtaposed faces of the plates 246, 254.

The four resulting capacitors may then be coupled in a bridge network such as that illustrated in FIG. 11. Flow through the otherwise balanced flowmeter sensor causes a displacement of the venturi armature members 240, 242 toward each other as indicated by the motion arrows 256. This displacement results in a decrease of the capacitive reactance of the capacitors $C_2$ and $C_3$ which unbalances the bridge 258 and results in a net alternating current signal flowing through the meter instrument 260, due to the increase in magnitude of current through the capacitors $C_2$ and $C_3$ with respect to that through the capacitors $C_1$ and $C_4$.

Referring to FIG. 12, an example of the invention is illustrated which utilizes a venturi flow sensor transducer system 264 similar, for example, to that shown in FIG. 1, and a bridge network 266 similar to that illustrated in FIG. 4. This system provides what is termed a true mass system 264 simliar, for example, to that shown in FIG. 1 meter by which is denoted a transducer system which provides an electrical signal output which is proportional to the mass flow per unit time through the conduit of the system for substantially all fluids including compressible fluids. To this end a propeller device 268 is mounted on a strut apparatus 270. At least one of the blades of the propeller device is fabricated of magnetic material or includes a magnet or magnetic material insert in one or more of the blades. A magnetic or variable reluctance pick-up transducer 272 is mounted on the external wall of the conduit of the system in magnetic interaction relationship with the magnetic material in the propeller of the device 268. The frequency of the signal output of the transducer 272 is, for all fluids including compressible fluid, substantially directly proportional to the velocity of the fluid through the conduit of the system. The signal is impressed through the leads 274 to one input of a dividing network 276 while the output signal from the bridge network 266, which is proportional to the mass flow times the velocity, is impressed through the leads 278 onto a second input terminal of the dividing network 276. The network 276 may be a conventional dividing network which divides the bridge network output signal by the pick-up transducer 272 signal output and obtains at its output terminals 280, a signal which is directly proportional to the true mass rate of flow through the conduit of the system.

In FIG. 13, a single diaphragm embodiment of the invention is illustrated which includes a housing body 282 which may be constructed and assembled substantially similar in all important respects to that of the example of FIG. 1. In this example, however, multifilar toroidal coils 284, 286 each wound on a phenolic bobbin 288 are each disposed within a toroidal magnetic circuit comprising an outer rim member 290, an inner, magnetic stainles rim member 292 and an annular interconnecting disk member 294. Each of these rim and disk members are fabricated of low reluctance paramagnetic material. The outer rim members 290 are circumferentially sandwiched about the periphery of a permeable diaphragm member 296 while the inner rim members 292 are each axially spaced slightly therefrom. Thus, it may be seen that the magnetic circuit for each of the coils includes the axial length of an outer rim member 290, the radial width of an annular connecting disk member 294, the axial length of an inner rim member 292, the gap between the permeable diaphragm member 296 and a juxtaposed end of one of the inner rim members 292, and the radial dimension therefrom, through the permeable diaphragm to the outer rim member 290.

Under static conditions, the reluctance of the two circuits may be made equal or electrically balanced externally.

The diaphragm member 296 is centrally apertured as shown to form an open nozzle portion 300, which has a larger diameter at its left hand end where it joins the radially planar outer portion of the diaphragm member than it has at its right hand end which forms the outlet of the nozzle. The nozzle effect when fluid is passed through the device in the direction of the arrows 298, provides, as does the Bernouli effect in the above examples, a reduced pressure to the right of the nozzle portion 300 such that the magnitude of the pressure differential on either side of the permeable diaphragm member 296 is proportional to the square of the velocity of the fluid flow therethrough. The resulting force to the right on the diaphragm member causes an axial displacement thereof which decreases the reluctance of the magnetic circuit associated with the coil 286 and increases the reluctance of the magnetic circuit associated with the coil 284. This difference in inductive reactance or in mutual inductance between individual ones of the windings of the multifilar coils may be utilized, as in the previous bridge networks shown, to provide an observable or recordable measure of the velocity of the flow of fluid through the device.

Figure 14:
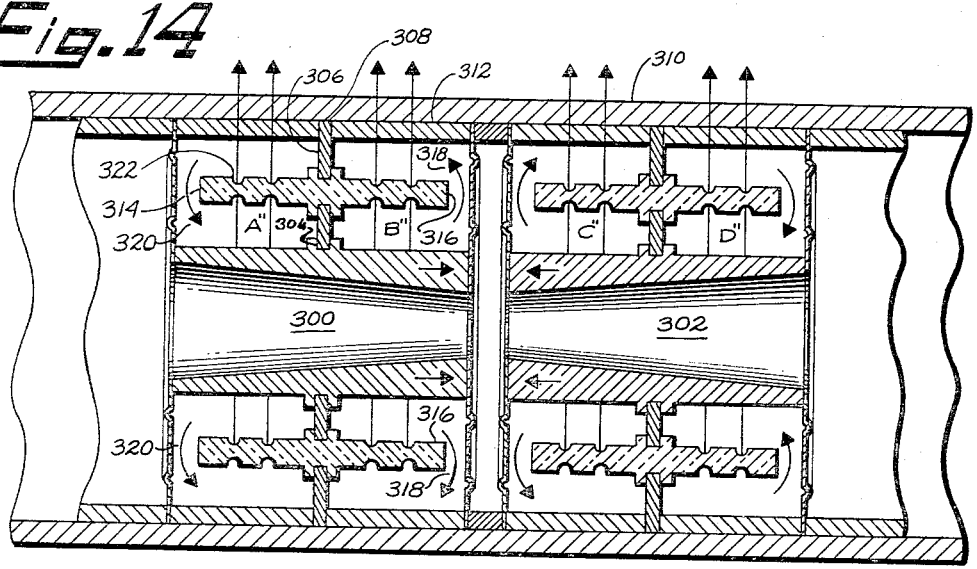

Referring to FIG. 14, an example of the invention is illustrated in which the sensing means for detecting the axial displacement of a pair of venturi armature members 300, 302 includes a strain gage network mechanization. In the example shown, each of the armature venturi members carries an inner end 304 of a plurality of angularly equally distributed strain gage supporting spring members 306, the radially outer end 308 of each of the spring members is affixed to a stationary position on the inner wall of the housing body 310 by a series of ferrule-like spacers 312 as shown. In this example of the invention, four of the supporting spring members 306 are utilized angularly symmetrically spaced about each of the armature venturi members. Note that in the figure only two of each set are shown. Each of the spring members carries an elongated strain gage wire supporting insulated rod 314, which may have a quartz, sapphire, or the like, composition, such that flexing of the spring member 306 due to axial displacement of the armature venturi members causes a rotation of the sapphire supporting rod about its center and in an axial plane. This rotation of the rods is symmetrical causing those rod ends 316 closest to the plane of symmetry of the sensor device all to move radially outwardly, for example, when the fluid flow rate through the device is increased as indicated by the arrows 318 while the outer ends of the sapphire rods are caused to move radially inwardly as indicated by the arrows 320. Each end of the insulated rods is circumferentially grooved as shown to form a set of retaining channels for a multi-turn circumferential strain gage sensor 322. The four sensors in this example each comprise two complete turns of strain gage sensor wire and are labeled, for analogous correlation with the circuit diagrams discussed earlier, A″, B″, C″, D″ from left to right in the figure. The resulting set of strain gage sensor elements may then be connected in a push-pull or bridge network similar to any of those shown or discussed earlier hereinabove and the resulting operation is substantially identical thereto. It may be noted, however, that in this example the "excitation" signal may be direct current with the bridge elements consisting of the resistive strain gage elements.

Figure 15:
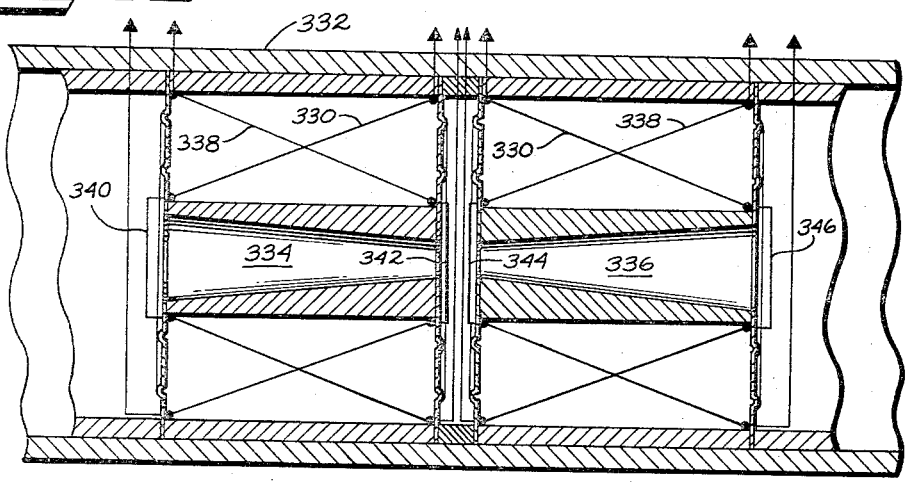

In FIG. 15, an alternative strain gage sensor mechanization of the invention is illustrated in which to the basic venturi armature and supporting diaphragm assembly as shown in the earlier figures is connected to a plurality of strain gage wire sensing elements 330 which are connected in tension between an axially central location on the outer housing body 332 and an axially outer point on a respective one of a pair of venturi armature members 334, 336. Similarly, a set of strain gage wire sensing elements 338 are connected in a tension supporting relation between an axially outer position on the housing body 332 and an axially inner point on a respective one of the venturi armature members 334, 336. Each set of the wire sensing elements 330, 338 may be arranged in angularly symmetric distribution throughout the toroidal space between respective ones of the armature members and the outer housing body; and each set may be connected in series as indicated; for example, by the leads 340, 342, 344, 346. Then each of the four sets may be connected into a bridge network as in the case of the apparatus discussed and described in connection with FIG. 13.

Figure 16:
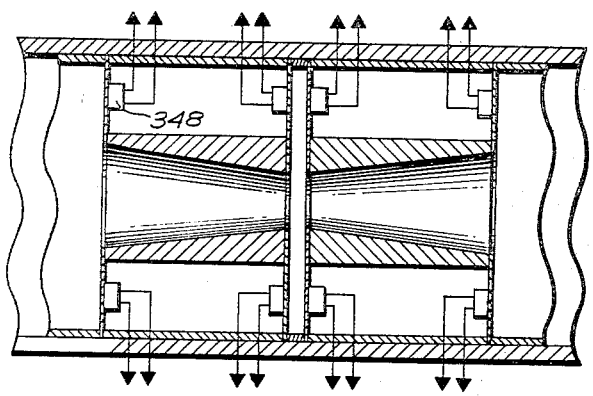

Referring to FIG. 16 the structure illustrated may be identical with that of FIG. 15 except that instead of utilizing strain gage wires as the strain sensing element, different sets of miniature strain gage elements 348 may be bonded in an appropriate array to the axially resilient armature supporting diaphragms as shown. Again, the different sets of strain gages may be appropriately connected in series to provide the desired sensitivity and to form the desired number of sets thereof for interconnection into the desired bridge or other detecting network.

Figure 17:
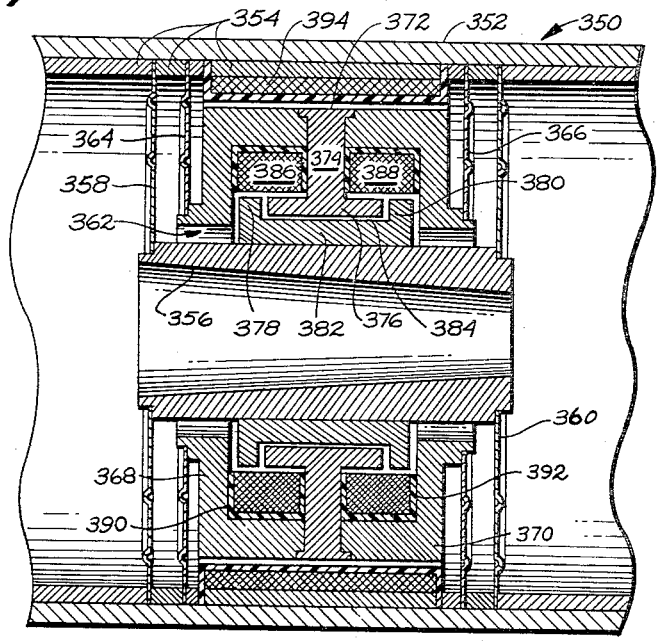

Referring to FIG. 17, an example of the invention is illustrated which is particularly useful in vibratory, or otherwise accelerating, environments. In the figure only one half of the flowmeter transducer is illustrated, it being understood that the apparatus shown in detail may be axially, symmetrically repeated from a plane of symmetry disposed at either end of the portion illustrated.

In this example, the flowmeter 350 comprises an outer cylindrical housing body 352 within which is disposed a series of annular spacers 354 for removably securing the axial displacement of the internal component parts of the transducer. An axially movable venturi member 356 is suspended between a pair of annular, supporting diaphragms 358, 360. Suspended axially within the diaphragms 358, 360 is a movable coil assembly 362 which is similarly supported by a pair of annular diaphragms 364, 366. The coil assembly 362 comprises a pair of symmetrical, juxtaposed, annular, magnetic, coil supports 368, 370 which are spaced from their plane of symmetry by a magnetic member 372 which includes an annular disk portion 374 and an inner rim portion 376 extending symmetrically toward radially inwardly extending portions of each of the annular coil supports 368, 370. Interposed between the juxtaposed portions of the inner rim portion 376 and the inwardly extending portions of the supports 368, 370, respectively, is a radially outwardly extending flange portion 378, 380 of a magnetic armature member 382, the latter being affixed to the movable venturi member 356. The radial gap 384 between the cylindrically juxtaposed central portions of the armature 382 is as small as possible whereby, having a large area of juxtaposition, its reluctance is relatively small compared to the axial gaps between the ends of the rim portion 376 and the coil supports 368, 370. These latter are not totally filled by the flange portions 378, 380 and, accordingly, these axial gaps are variable depending upon the relative position of the armature 382 carried by the venturi member 356.

Each of the coil supports 368, 370 has associated therewith a sensing coil 386, 388, respectively. Each is wound on a bobbin 390, 392 and emplaced within the toroidal volume defined by the magnetic coil supports 368, 370 and the magnetic member 372.

The operation of the transducer as varying the reluctance of the magnetic circuit of each coil and, thereby, its inductive reactance is substantially as discussed earlier in connection with the previous figures. The primary distinction of the present embodiment is that the sensing coil assembly is also suspended on axially flexible diaphragms. In the practice of the invention, the natural frequencies of the two suspended bodies (venturi assembly and coil assembly) are made equal as determined by their masses and effective spring constants. For purposes of providing a fine frequency adjustment for equalizing the two natural frequencies associated with half of the flowmeter, a balancing coil 394 is disposed contiguously about and in a solenoid effect relationship with the coil assembly 362. Thus, by varying the current through the centering coil 394, the effective spring constant of the movable coil assembly 362 may be controlled. By this means, the instrument is made electrically insensitive to vibration or other accelerations, because the acceleration induced movements of one part of the transducer are duplicated by the other so that the relative displacement between them, as affecting the magnetic circuits of the sensing coils, is zero.

Another class of examples of the invention, not specifically depicted, comprises a cylindrical housing body 16 such as illustrated in FIG. 1, for example, but which instead of being coupled to system piping 22, is suspended on rigid struts within a fluid conveyor of relatively much larger diameter than that of the housing body portion 16 of the flowmeter 14. The fluid then flows over the external surfaces of the flowmeter as well as through the axial apertures in the end members 18, 22. The meter operates exactly as in other embodiments discussed above except that a straight forward correction is made in the electric or mechanical apparatus for the proportionally, and somewhat smaller, velocity through the flowmeter as compared with the velocity of flow around the meter.

There has thus been disclosed and described a number of examples of an electromagnetic flowmeter system and method according to the present invention which exhibit the advantages and achieve the objects set forth hereinabove.

What is claimed is:

1. A flowmeter structure for measuring fluid flow therethrough, comprising:
   first and second venturi members, defining flow channels varying from a large sectional dimension to a smaller sectional dimension, to provide internal tapers;
   diaphragm means for flexibly supporting said first and second venturi members independently and spaced apart, to receive said fluid flow whereas solely said fluid flow through said venturi members displaces said venturi members, said first and second venturi members being supported by said diaphragm means to position the internal taper of said first venturi member in opposing relationship to the internal taper of said second venturi member; and
   means for sensing displacement of said first and second venturi members resulting from fluid flow therethrough whereby to manifest a measurement of said fluid flow.

2. A flowmeter structure according to claim 1 wherein said first and second venturi members are supported by said diaphragm means to be oppositely displaced to a degree related to said fluid flow therethrough and wherein said means for sensing manifests such opposed displacement.

3. A flowmeter structure according to claim 2 wherein said sensing means comprises electromagnetic means for sensing displacement as an electrical signal.

4. A flowmeter structure according to claim 2 wherein said venturi members are similarly symmetrical.

5. A flowmeter structure according to claim 1 wherein said first and second venturi members define similar flow channels and wherein said diaphragm means support said venturi means in aligned spaced-apart relationship to provide similar facing apertures.

6. Flowmeter structure comprising:
   conduit body defining an axial path therethrough for fluid substance;
   a pair of venturi members each having two end portions and being disposed substantially axially symmetrically to each other on opposite sides of a plane of symmetry disposed transversely across said path;
   centrally apertured axially flexible diaphragm members affixed supportingly to said venturi member at each of their four said end portions; and
   axial displacement strain sensitive electric sensing elements coupled to at least some of said diaphragm members for detecting axial displacement of said venturi members with respect to said conduit body.

7. Meter apparatus comprising:
   substantially rigid conduit body defining a flow path for fluid substance axially therethrough;
   first pair of axially flexible diaphragm members disposed within said conduit body contiguously to a plane of symmetry extending transversely to said flow path, said diaphragm members being centrally apertured to permit the flow of said fluid substance;
   second pair of axially flexible diaphragm members similarly apertured and disposed one each substantially symmetrically from said plane of symmetry and separated axially from an associated one of said first pair by a predetermined axial length; and
   a pair of venturi members each comprising a hollow cylindrical-like form having a length substantially equal to said predetermined axial length and having a tapered inner diameter which varies smoothly from a minimum diameter toward one end to a maximum diameter toward the other, individual ones of said venturi members being supported in axially movable relation, with respect to said conduit body, by the radially inner portions of a predetermined one of said pairs of said diaphragm members on either side of said plane of symmetry, said two venturi members being disposed with their tapered inner portions axially symmetrically imaged from said plane of symmetry.

8. Flowmeter apparatus comprising:
   substantially rigid conduit body defining a flow path for fluid substance axially therethrough;
   first pair of axially flexible diaphragm members disposed within said conduit body contiguous to a plane of symmetry extending transversely to said flow path, said diaphragm members being centrally apertured to permit the flow of said fluid substance;
   second pair of axially flexible diaphragm members similarly apertured and disposed one each substantially symmetrically from said plane of symmetry and separated axially from an associated one of said first pair by a predetermined axial length;
   a pair of venturi members each comprising a hollow cylindrical-like form having a length substantially equal to said predetermined axial length and having a tapered inner diameter which varies smoothly from a minimum diameter toward one end to a maximum diameter toward the other, individual ones of said venturi members being supported in axially movable relation, with respect to said conduit body, by the radially inner portions of a predetermined one of said pairs of said diaphragm members on either side of said plane of symmetry, said two venturi members being disposed with their tapered inner portions symmetrically imaged from said plane of symmetry; and axial displacement sensitive electric sensor means coupled between said conduit body and at least one of said venturi members.

9. The invention according to claim 7 in which first pair of diaphragm members are axially separated by a distance short compared to the transverse dimensions of said diaphragm member and in which the inner portions of each of said centrally apertured diaphragm members are peripherally sealed to said end portions thereby to form an annular space about said plane of symmetry which communicates with said axial fluid flow path.

10. The invention according to claim 8 in which said electric sensor means includes a paramagnetic element carried by at least one of said venturi members and magnetic circuit means carried by said conduit body and magnetically coupled to said paramagnetic element to a predetermined degree the magnitude of which is dependent upon the instantaneous disposition of said venturi member with respect to said conduit body.

11. The invention according to claim 8 in which said electric means includes at least four electric sensing elements which are intercoupled to form a detecting bridge.

12. The invention according to claim 8 in which said electric transducer means includes first, second, third and fourth effectively bifilar wound coils carried by said conduit body and first and second paramagnetic elements carried respectively by separate ones of said venturi members, said first paramagnetic element being magnetically intercoupled in the reluctance circuit between the bifilar windings of said first coil and in the reluctance circuit between the bifilar windings in said second coil, said second paramagnetic element being similarly magnetically intercoupled in the reluctance circuits respectively of said third and fourth bifilar coils; and the invention further including an alternating excitation means coupled to one winding of each of said four bifilar coils, the other winding of each coil constituting signal pickup windings.

13. The invention according to claim 8 which further includes servo-mechanical means coupled to said venturi members for affecting their relative axial displacement.

14. Meter system comprising:
conduit body member defining a flow path for fluid substance axially therethrough;
first pair of axially flexible diaphragm members disposed within said conduit body member contiguously to a plane of symmetry extending transversely to said flow path, said diaphragm members being centrally apertured to permit the flow of said fluid substance therethrough;
second pair of axially flexible diaphragm members similarly apertured and disposed one each substantially symmetrically from said plane of symmetry, and separated axially from an associated one of said first pair by a predetermined axial length;
a pair of venturi members each comprising a hollow cylindrical-like form having a length substantially equal to said predetermined axial length, and having a tapered inner diameter which varies smoothly from a minimum diameter toward one end to a maximum diameter toward the other end, individual ones of said venturi members being supported in an axially restoring relation with respect to said conduit body, by the radially inner portions of a pair of said diaphragm members on either side of said plane of symmetry, said two venturi members being disposed with their tapered inner portions substantially symmetrically imaged from said plane of symmetry;
axial displacement sensitive, electric sensor means coupled between said conduit body member and at least one of said venturi members, said electric sensor means including first, second, third and fourth coils constituting bridge elements of a detector network and carried by said conduit body;
first paramagnetic element carried by one of said venturi members and being magnetically intercoupled conjugatively in the reluctance paths of said first and second coils; and
second paramagnetic element carried by the other of said venturi members and magnetically intercoupled conjugatively in the reluctance paths of said third and fourth coils.

References Cited

UNITED STATES PATENTS

| 2,769,337 | 11/1956 | Rich | 73—211 X |
| 3,251,226 | 5/1966 | Cushing | 73—213 X |
| 2,538,785 | 1/1951 | Karing | 73—211 XR |

FOREIGN PATENTS 613,478  11/1948  Great Britain.

RICHARD C. QUEISSER, *Primary Examiner.*

EDWARD D. GILHOOLY, *Assistant Examiner.*